United States Patent [19]
Cushing

[11] Patent Number: 6,011,652
[45] Date of Patent: Jan. 4, 2000

[54] MULTILAYER THIN FILM DIELECTRIC BANDPASS FILTER

[76] Inventor: David Henry Cushing, 7131 Quinnfield Way, Greely, Ontario, Canada, K4P 1B6

[21] Appl. No.: 08/996,513

[22] Filed: Dec. 23, 1997

[51] Int. Cl.[7] .................................................. G02B 5/28
[52] U.S. Cl. ........................... 359/588; 359/588; 359/359
[58] Field of Search .................... 359/580, 584, 359/586, 588, 589, 359

[56] References Cited

U.S. PATENT DOCUMENTS 4,373,782  2/1983  Thelen .................................. 359/588
5,410,431  4/1995  Southwell .............................. 359/588
5,719,989  2/1998  Cushing ................................. 359/588

Primary Examiner—Jon W. Henry
Attorney, Agent, or Firm—Neil Teitelbaum & Associates

[57] ABSTRACT

The present invention relates to a multi-layer dielectric bandpass filter having a primary and a secondary passband. A secondary passband outside the reflection zone of the primary passband is optimized to reduce ripple achieving a passband of at least 90% transmission. Optimization comprises modifying the thickness of certain quarter wavelength reflector layers of a single passband filter from true quarter wavelength at the primary passband to non-quarter, or non-integer-multiple quarter wave thickness.

11 Claims, 5 Drawing Sheets

| Illuminant: | WHITE |
|---|---|
| Medium: | GLASS |
| Substrate: | GLASS |
| Exit: | GLASS |
| Detector: | IDEAL |
| Angle: | 0.0 (deg) |
| Reference: | 1556.0 (nm) |
| Polarization: | S — P — |
| Remark: | 4 CAVITY FILTER |

Transmittance (%) vs Wavelength (nm)

| Illuminant: | WHITE |
|---|---|
| Medium: | GLASS |
| Substrate: | GLASS |
| Exit: | GLASS |
| Detector: | IDEAL |
| Angle: | 0.0 (deg) |
| Reference: | 1556.0 (nm) |
| Polarization: | S — P — |
| Remark: | 4 CAVITY FILTER |

Transmittance (%) vs Wavelength (nm)

Illuminant: WHITE
Medium: BK7
Substrate: BK7
Exit: BK7
Detector: IDEAL
Angle: 0.0 (deg)
Reference: 980.0 (nm)
Polarization: Ave —
Remarks: 4 cavity filter Illuminant: WHITE
Medium: BK7
Substrate: BK7
Exit: BK7
Detector: IDEAL
Angle: 0.0 (deg)
Reference: 580.0 (nm)
Polarization: Ave —
Remarks: 4 cavity filter

MULTILAYER THIN FILM DIELECTRIC BANDPASS FILTER

FIELD OF THE INVENTION

This invention relates to multi-layer dielectric bandpass filters, and more particularly to multi-cavity multi-layer dielectric bandpass filters wherein non-quarter wave layers are provided in one or more reflecting stacks for reducing ripple in at least a second passband outside of the reflection zone.

BACKGROUND OF THE INVENTION

It is generally desirable to have bandpass filters that have at least 90% transmission in at least two passbands where they are intended to transmit light. Filters based on optical interference principles are highly versatile, and may be designed for use throughout the entire optical spectrum. For filters for communications applications, in particular, there is a need to transmit with very low losses in more than one band. The usual bands are typically: 850 nm to 950 nm; 950 nm to 1020 nm; 1060 nm to 1120 nm; 1250 nm to 1350 nm; and 1500 nm to 1650 nm.

Multi-cavity dielectric filters have been manufactured for more than 40 years. Most bandpass filters are designed to operate in transmission and will transmit one wavelength zone. The light for the adjacent wavelengths is reflected. Therefore, adjacent to the principle transmission band of a dielectric thin film filter, there is a reflection zone on each side. Outside and adjacent to the reflection zone and yet more distant from the principle transmission zone there are generally side lobes or side bands where the filter is substantially transmissive however where transmission is typically uncontrolled and quite variable.

Variation in layer thickness has been used to improve filter response as disclosed in Ser. No. 08/743,734, by the present invent or, to reduce reflections caused by mismatch between the filter material and adjoining media. Alteration is made to the thickness of layers near the input and output interfaces only in this application. In general, a bandpass filter is constructed of quarter and half wavelength layers or multiples of these units. Variation in the layer thicknesses has not otherwise been disclosed. Optimizing a second passband region outside the reflection zone has not been disclosed.

It is an object of this invention, to provide filters that have a high controlled transmission in at least a secondary passband region substantially outside the reflection zone of the filter without substantially adversely affecting transmission in the primary passband region.

It is a further object of the invention to provide an optical filter that has two passband regions separated by a reflection zone, wherein transmission within the two passband regions is at least 90%.

SUMMARY OF THE INVENTION

The present invention has found that bandpass filters can be optimized to pass light favorably in the normally uncontrolled secondary passband regions. Changes to the single passband filter structure involve modifying the thickness of selected layers in the reflector stacks to change the transmission contours to establish the secondary passband in the proper spectral area with the highest possible transmission. In addition one or more multiple halfwave layers may be incorporated to allow the desired wavelengths in both the primary and secondary passband regions to pass. A secondary passband can be established at substantially any selected bandwidth within the dielectric bandpass range.

In accordance with the invention, a bandpass filter is provided having at least a primary passband region and a secondary passband region outside of the reflection zone of the filter, the filter comprising at least two outer cavities and at least one inner cavity disposed therebetween, each cavity having a spacer region of at least a high or low index material disposed between two reflector stacks, the reflector stacks of at least some of the cavities including quarter wave layers, said quarter wave layers, being a quarter-wave in thickness at the primary passband, the reflector stacks of at least one cavity including one or more a non-quarter wave layers, said one or more non-quarter wave layers being a non-integer-multiple of a quarter wave in thickness for enhancing transmission in the secondary passband.

In accordance with the invention, a bandpass filter is provided for passing at least a primary wavelength passband and a secondary wavelength passband comprising: a plurality of cavities adjacent one another including a first outer cavity, a second outer cavity and at least one cavity disposed therebetween, each cavity comprising a spacer region disposed between two reflectors, some spacer regions comprising a high and low refractive index layers, said layers being of a thickness of a half-wave or multiple half wave at the primary passband, at least one reflector of one of the cavities comprising one or more layers of alternating high and low index material, at least some of the reflector layers being of a thickness that is a non-quarter wave or non-integer-multiple-quarter wave, other of the reflector layers in at least some of the cavities being quarter wave layers.

BRIEF DESCRIPTION OF THE DRAWINGS

Exemplary embodiments of the invention will now be described in conjunction with the drawings, in which.

Table 1 lists the layer thicknesses and filter structure for a four cavity bandpass filter described in Example 1;

Table 2 lists the layer thicknesses and filter structure for a five cavity bandpass filter described in Example 2; and, Table 3 lists the layer thicknesses and filter structure for a three cavity filter described in Example 3; and, Table 4 lists the layer thicknesses and filter structure for the four cavity filter described in Example 4.

GENERAL INFORMATION ABOUT FILTER CONSTRUCTION

Filters for wavelength division multiplexers and other communication industry applications require very straight slopes with low loss and virtually no ripple. Typical bandwidths range from 0.5 nm to 100 nm. There are many other applications for filters that would benefit from the improvement in technology that is provided by this invention.

Figure 1:
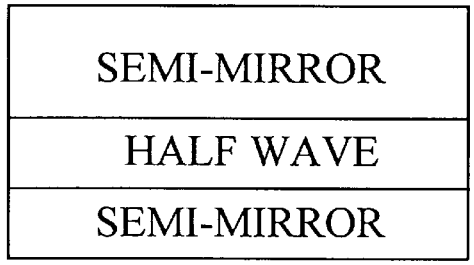
FIG. 1 is a cross sectional view of a solid etalon filter in accordance with the prior art.

The simplest filter, shown in prior art FIG. 1, consists of two partial-reflectors or semi-mirrors separated by a half wave layer of transparent dielectric material.

Figure 2:
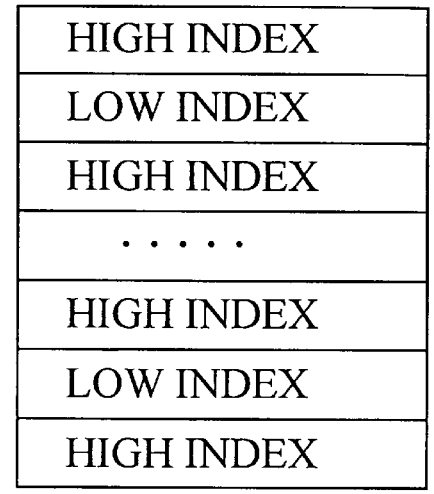
FIG. 2 is a cross sectional view of a prior art quarter wave stack (QWS)

Turning now to FIG. 2, for all-dielectric filters, the partial-reflector shown consists of alternating layers of high and low index materials. Each layer is deposited as a quarter wave (QW) thickness at the wavelength of the desired filter. Each partial-reflector (which may be comprised of only a single layer) is called a quarter-wave stack. The bandwidth of the filter is a function of the reflectance of quarter-wave stacks in the structure.

Figure 3:
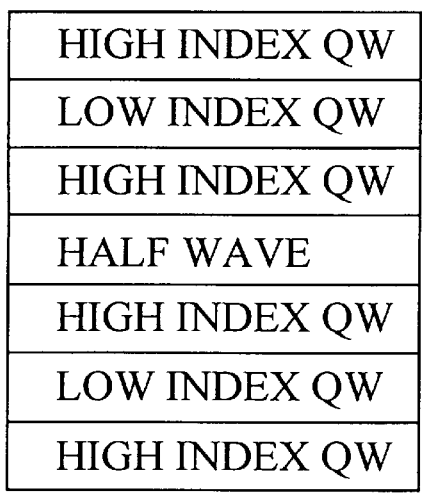
FIG. 3 is a cross sectional view of a prior art dielectric filter cavity.
Figure 4:
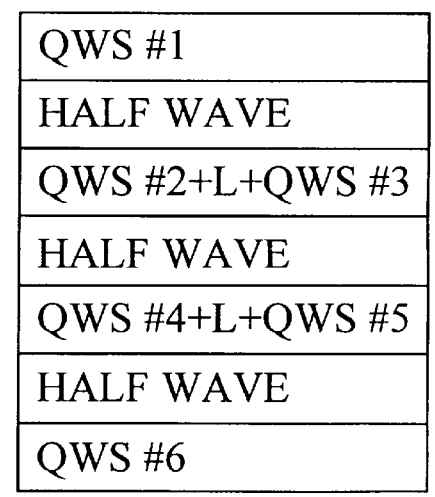
FIG. 4 is a cross sectional view of a prior art multi-cavity filter.

Referring now to FIG. 3, a filter cavity, the basic building block for all-dielectric interference filters, is shown. The cavity is comprised of two reflectors made from quarter-wave stacks separated by a half wave (or multiple halfwave) layer, as is seen in FIG. 3. Cavities are deposited on top of other cavities, with a quarter-wave layer of low index material between, to sharpen the slopes of the transmission response. This produces a multi-cavity filter shown in FIG. 4.

The substrate is transparent over the wavelength of interest and, may be made from a wide variety of materials including (but not limited to), glass, quartz, clear plastic, silicon, and germanium. The dielectric materials for this application have indices of refraction in the range 1.3 to beyond 4.0. Some preferred materials are: Magnesium Fluoride (1.38), Thorium Fluoride (1.47), Cryolith (1.35), Silicon Dioxide (1.46), Aluminum Oxide (1.63), Hafnium Oxide (1.85), Tantalum Pentoxide (2.05), Niobium Oxide (2.19), Zinc Sulphide (2.27), Titanium Oxide (2.37), Silicon (3.5), Germanium (4.0), and Lead Telluride (5.0). Other dielectric materials would serve as well.

Design of the filter is easily accomplished with the aid of commercially available computer programs with optimization routines (i.e. TFCalc™ by Software Spectra Inc.). Design recipes are entered into the program and the spectral response is calculated. When the design with the proper size cavities is selected to match the required nominal bandwidth, optimization of the filter transmission is performed for the matching layers. The designer selects from a choice of materials to use in a quarter wave match or may choose to use the same low index material with thickness adjustments to accomplish the matching.

DETAILED DESCRIPTION

Figure 5:
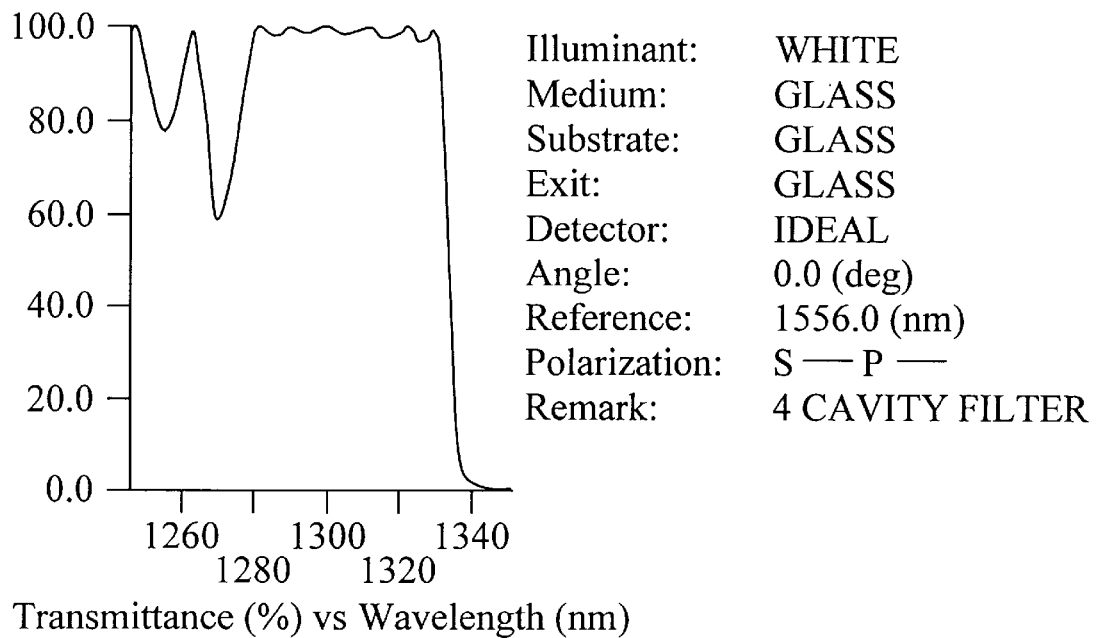
FIG. 5 is a graph of a transmittance response according to the present invention having a broken away section of the reflection band between 1340 nm and 1530 nm where the reflection spectrum is not shown and wherein a primary passband and a secondary passband is shown.
Figure 5:
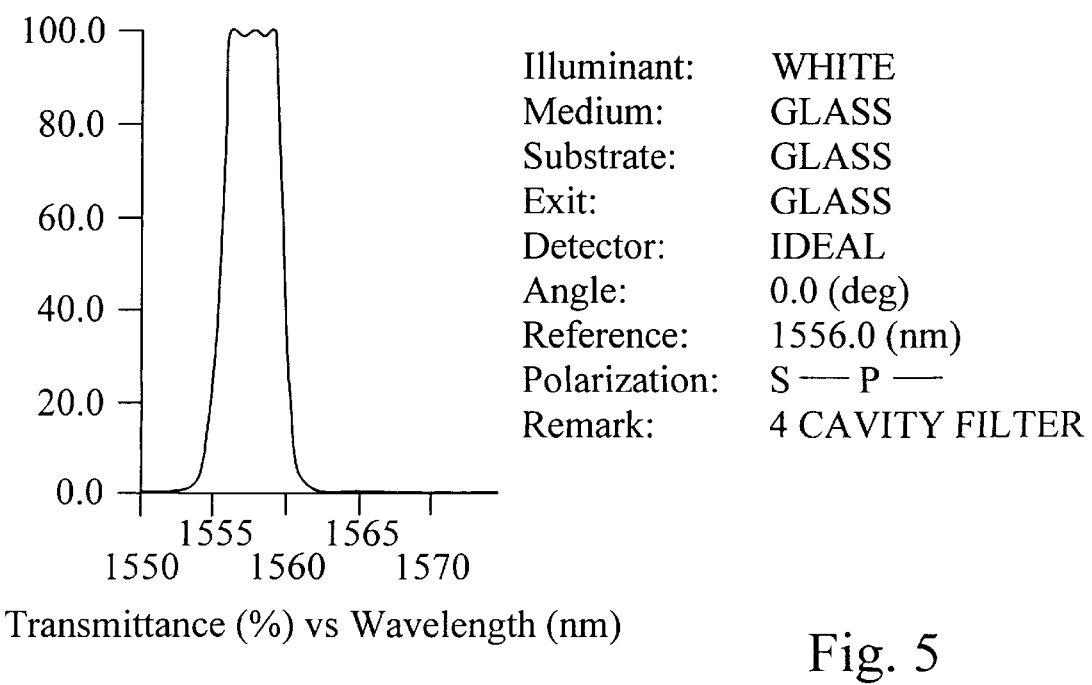

Referring now to FIG. 5, an output response for an all-dielectric multi-cavity filter having a principle passband centered at 1557 nm and its secondary passband optimized at 1300 nm is shown in accordance with this invention. The filter is designed with the aid of a commercially available filter design program, for example TFCalc.™ Using such programs to design bandpass filters having, for example two passbands, has not been practicable. Merely selecting two targets, regions, or passband zones, where transmission is desired for the design software to optimize, does not yield a design for a passband filter having two passbands with desirable transmissive characteristics. In general, when the design of a filter having preferred transmissive characteristics in a primary passband is altered so that it has nearly 90% or greater transmission in a secondary passband, the transmission in the primary passband is adversely affected. This type of girdle effect is well known in the art of filter making; where a change in transmissive characteristics often changes the transmissive characteristics in another region, or at other wavelengths.

The design of the basic filter prior to optimization is a multilayered structure wherein each layer is an integer multiple of a quarter wave in thickness at the primary passband wavelength. To establish a secondary pass zone in the desired spectral area outside the reflection zone, selected layers in some of the reflector stacks are altered in thickness from true quarter wave dimensions. The reflector stacks in the outer cavities especially may be selectively modified to no longer be integer multiples of a quarter wavelength, to optimize a secondary passband without reducing the performance of the filter at its primary passband unacceptably. Generally the outer layers of the outer cavities are first selected for alteration. It is usually desired to preserve a core of each cavity surrounding and including the spacer region, and to preserve the interfaces adjacent the inner cavity, and the inner cavity itself, unchanged. In some cases alterations can be made to each of the cavities to achieve the desired effect without compromising the primary passband.

In addition, the number of half wave spacer layers may be selected in the bandpass structure to eliminate or at least substantially reduce the effects of polarization if the filter is used at an angle.

In the four cavity filter illustrated by its response in FIG. 5, the first and last layers of each of the reflectors are allowed to have different thicknesses in order to optimize the transmission of both the primary passband and the secondary passband. The layer thicknesses are shown as units of 1557 nm quarter wavelength in Table 1.

Figure 6A:
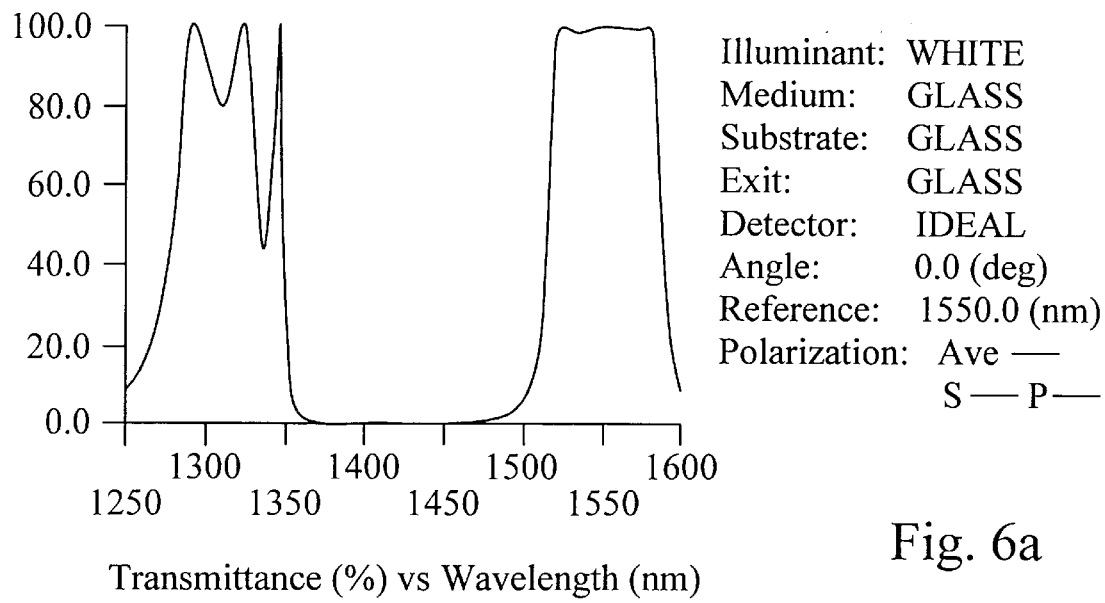
FIG. 6a is a graph of a transmittance response of a 1550 nm bandpass filter, illustrating an uncontrolled transmissive side passband lobe.

A single passband five cavity filter as known in the art exhibits a response as illustrated in FIG. 6a. The primary passband at 1500 nm shows a good square response of better than 98% transmission with a high slope, and accordingly little transition area transmission. This region is surrounded by reflection zones of wavelengths which cannot pass through the filter. At either side of the reflection zones, however, there are secondary passband side lobes. These secondary passbands typically exhibit a variable response, termed ripple, as seen in the present example, which reduces reliable transmission, in this example to only about 42%.

It has been found that the secondary passband responses can be optimized by varying the thickness of some of the quarter wavelength layers of the reflector stacks. Layer thickness is measured in quarter wavelength units for the 1550 nm passband. The filter remains substantially as constructed for the primary passband. However, the thickness of some of the outer layers of the first, second, fourth and fifth cavities is modified to optimize the 1300 nm passband. A commercially available computer program, such as TFCalc™, is used to select the thicknesses necessary to produce the desired result. Specifically in this example, modification to layers 5,6,7,35,36,37 and 41, seven of the 41 layers, produces the response shown in FIG. 6b, with 90+% passband at 1300 nm and substantially no compromise in response at 1550 nm.

Figure 7:
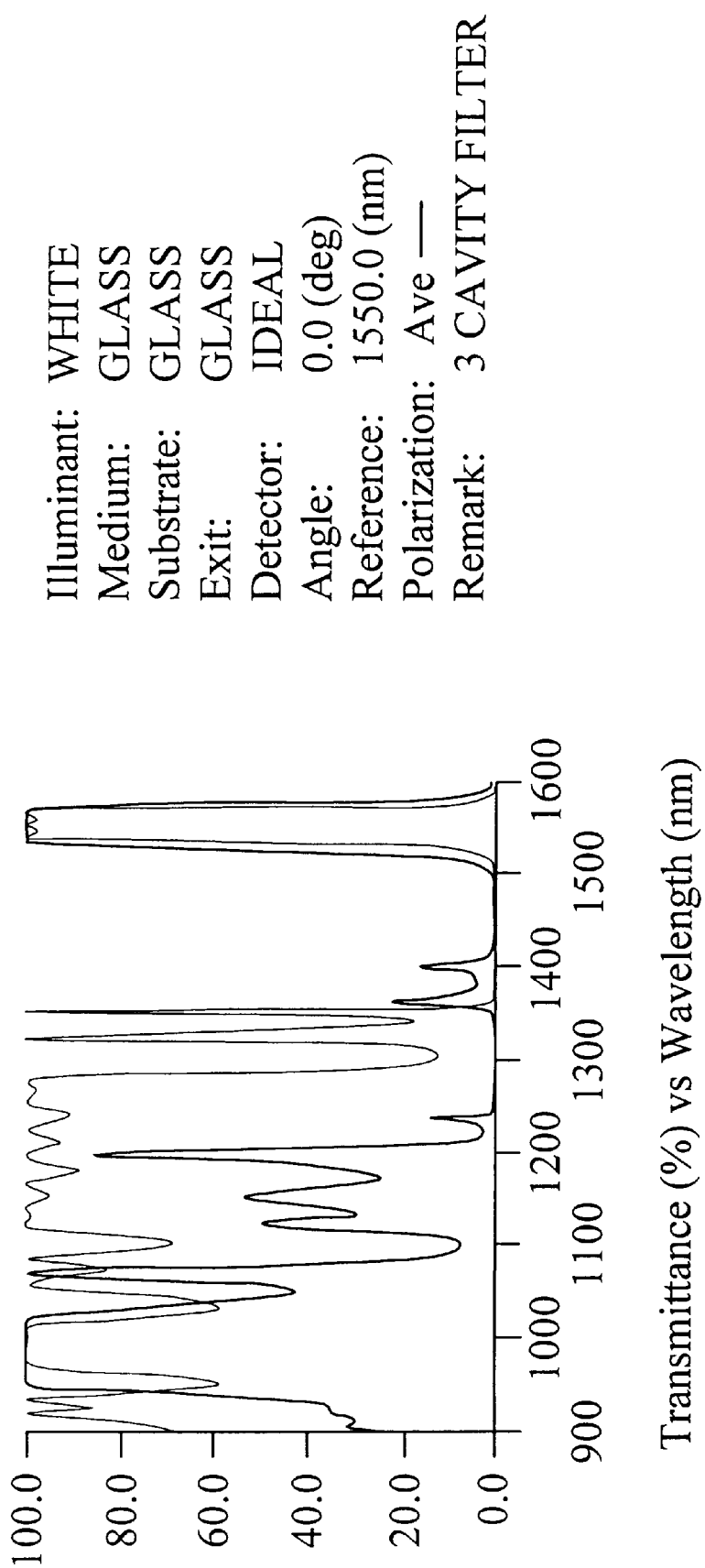
FIG. 7 is a graph of a transmittance response of a two passband filter shown before optimization (in fine line) and after optimization (in bold line) according to the present invention.

FIG. 7 illustrates the response of a three cavity filter having two passband zones. Prior to optimization, the response is illustrated in fine line. A filter optimized in accordance with the present invention shows a response illustrated in bold line. The filter structure is given in Table 3. The final result shows a primary passband at 1550 nm and a secondary passband at 980 which has no large reflection bands.

Figure 8A:
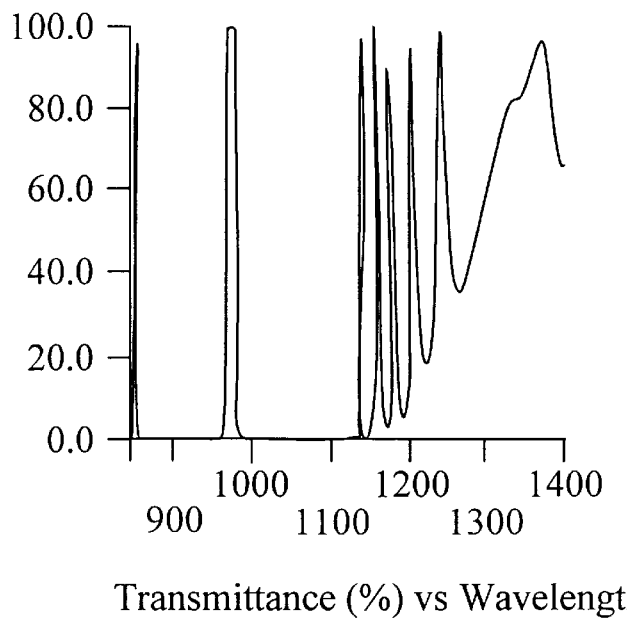
FIG. 8a is a graph of a transmittance response of a primary passband and a secondary side lobe; and, FIG. 8b is a graph of the transmittance response of the primary passband and a secondary passband of FIG. 8a after optimization according to the present invention.
Figure 8B:
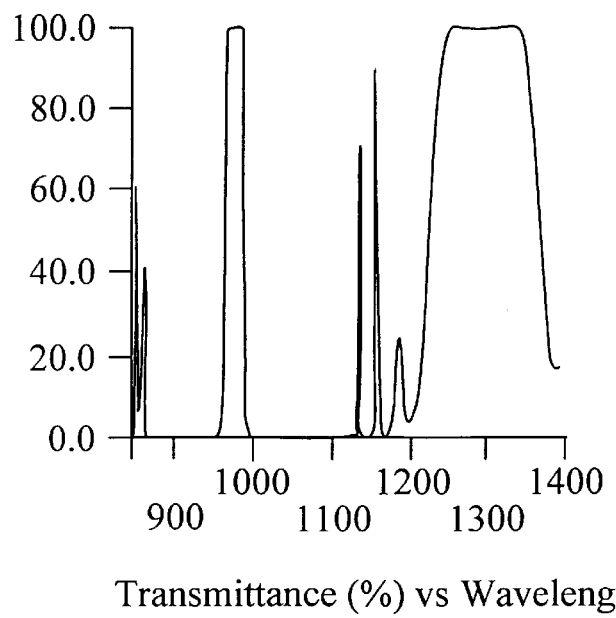

FIGS. 8a and 8b illustrate the transmission response of a filter having a relatively low wavelength primary passband optimized to pass a higher wavelength secondary passband. A primary passband at 980 nm show clearly in each graph. A secondary passband at 1300 mn provides optimized transmission as seen in FIG. 8b as modified according to the present invention.

EXAMPLES

Example 1

A four cavity filter composed of silicon dioxide (QD) and tantalum pentoxide (TA) is listed by layer, each column representing a cavity in table 1. The columns are arranged to show the symmetry about the half wave layers of each cavity. Quarter wavelength units for a 1557 nm passband are used. The output of this filter is shown in FIG. 5 indicating favorable passbands at 1300 nm and at 1557 nm. The use of multiple half wave layers are incorporated to reduce the effects of polarization if the filter is used at differing angles.

Example 2

Figure 6B:
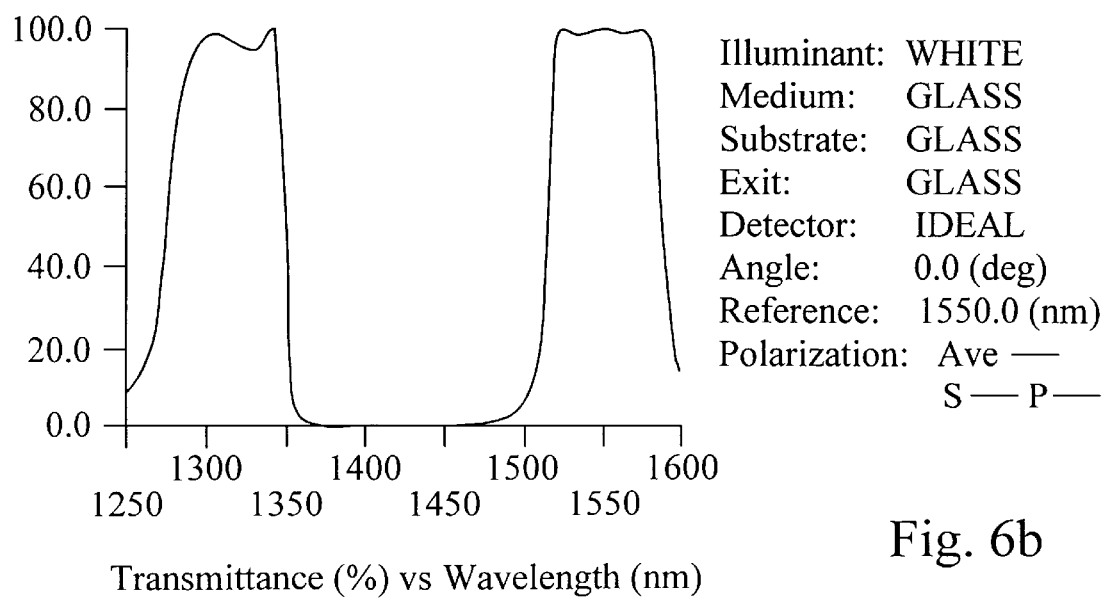
FIG. 6b is a graph of a transmittance response of the filter of FIG. 6a optimized in accordance with the present invention to include a primary and a secondary pass band.

A five cavity filter of titanium oxide (TI) and silicon oxide (QZ) is designed to optimize a 1550 nm passband filter to also pass a 1300 nm zone. The original filter response is illustrated in FIG. 6a. Optimization targets are chosen to improve the transmission from 1280 to 1320 nm. Selected layers of the reflector stacks are altered gradually, until the desired response, shown in FIG. 6b is achieved. The final design is shown in table 2.

Example 3

A three cavity filter is selected to pass the 1532–1560 nm band and also to pass the 960–1020 nm band. A filter of titanium oxide (TI) and silicon oxide (QZ) having a proper bandwidth at the 1550 nm band with no large reflection zone in the 980 nm band. Optimization targets are chosen to improve the transmission from 960 to 1020 nm. A minimum number of layers are selected for alteration, and the optimization routine is invoked. Adjustment is continued, altering more layers, until the passband desired is achieved. In this example the first and last four layers of each cavity were altered, and one titanium oxide layer was removed. FIG. 7 illustrates the original response of the 1532–1560 nm output, in fine line, and the final output with 960–1020 nm optimized. The final filter design is arranged as shown in table 3.

Example 4

A four cavity filter adapted to pass a 980 nm band is optimized to include a 1300 nm passband. Tantalum pentoxide (TA) and silicon dioxide (QD) are selected to create a 980 nm filter which has some transmission at 1300 nm. The half wave layers of the inner cavities are modified to three-quarter wavelengths preceding a full wavelength layer in order to remove ripple from the passband. The outer cavities have simple half wavelength layers. In addition, the first four and last two quarter wave layers of each cavity were varied in thickness. FIG. 8a illustrates the transmission response before, and FIG. 8b after modification. The final filter design is given in Table 4.

TABLE 1

|   |    |          |    |    |          |    |    |          |     |    |          |
|---|----|----------|----|----|----------|----|----|----------|-----|----|----------|
|   |    |          | 25 | TA | 1.695130 | 53 | TA | 1.443549 |     |    |          |
|   |    |          | 26 | QD | 0.374360 | 54 | QD | 0.010246 |     |    |          |
| 1 | TA | 0.643545 | 27 | TA | 1.625744 | 55 | TA | 1.019311 | 81  | TA | 1.148750 |
| 2 | QD | 0.910134 | 28 | QD | 1.000000 | 56 | QD | 1.000000 | 82  | QD | 0.347687 |
| 3 | TA | 1.249026 | 29 | TA | 1.000000 | 57 | TA | 1.000000 | 83  | TA | 1.298991 |
| 4 | QD | 1.000000 | 30 | QD | 1.000000 | 58 | QD | 1.000000 | 84  | QD | 1.000000 |
| 5 | TA | 1.000000 | 31 | TA | 1.000000 | 59 | TA | 1.000000 | 85  | TA | 1.000000 |
| 6 | QD | 1.000000 | 32 | QD | 1.000000 | 60 | QD | 1.000000 | 86  | QD | 1.000000 |
| 7 | TA | 1.000000 | 33 | TA | 1.000000 | 61 | TA | 1.000000 | 87  | TA | 1.000000 |
| 8 | QD | 1.000000 | 34 | QD | 1.000000 | 62 | QD | 1.000000 | 88  | QD | 1.000000 |
| 9 | TA | 1.000000 | 35 | TA | 1.000000 | 63 | TA | 1.000000 | 89  | TA | 1.000000 |
| 10 | QD | 1.000000 | 36 | QD | 1.000000 | 64 | QD | 1.000000 | 90  | QD | 1.000000 |
| 11 | TA | 3.000000 | 37 | TA | 3.000000 | 65 | TA | 3.000000 | 91  | TA | 3.000000 |
| 12 | QD | 4.000000 | 38 | QD | 4.000000 | 66 | QD | 4.000000 | 92  | QD | 4.000000 |
| 13 | TA | 3.000000 | 39 | TA | 3.000000 | 67 | TA | 3.000000 | 93  | TA | 3.000000 |
| 14 | QD | 1.000000 | 40 | QD | 1.000000 | 68 | QD | 1.000000 | 94  | QD | 1.000000 |
| 15 | TA | 1.000000 | 41 | TA | 1.000000 | 69 | TA | 1.000000 | 95  | TA | 1.000000 |
| 16 | QD | 1.000000 | 42 | QD | 1.000000 | 70 | QD | 1.000000 | 96  | QD | 1.000000 |
| 17 | TA | 1.000000 | 43 | TA | 1.000000 | 71 | TA | 1.000000 | 97  | TA | 1.000000 |
| 18 | QD | 1.000000 | 44 | QD | 1.000000 | 72 | QD | 1.000000 | 98  | QD | 1.000000 |
| 19 | TA | 1.000000 | 45 | TA | 1.000000 | 73 | TA | 1.000000 | 99  | TA | 1.000000 |
| 20 | QD | 1.000000 | 46 | QD | 1.000000 | 74 | QD | 1.000000 | 100 | QD | 1.000000 |
| 21 | TA | 0.999393 | 47 | TA | 1.000000 | 75 | TA | 1.000000 | 101 | TA | 1.314408 |
| 22 | QD | 0.000008 | 48 | QD | 1.000000 | 76 | QD | 1.000000 | 102 | QD | 0.821576 |
| 23 | TA | 1.784244 | 49 | TA | 0.186641 | 77 | TA | 1.456334 | 103 | TA | 0.649098 |
| 24 | QD | 1.000000 | 50 | QD | 0.295236 | 78 | QD | 0.839980 |     |    |          |
|   |    |          | 51 | TA | 1.855427 | 79 | TA | 1.493560 |     |    |          |
|   |    |          | 52 | QD | 1.000000 | 80 | QD | 1.000000 |     |    |          |

TABLE 2

| | | | | | | | | | |
|---|---|---|---|---|---|---|---|---|---|
| | | 7 | TI 1.2 | 17 | TI 1 | 27 | TI 1 | | |
| | | 8 | QZ 1 | 18 | QZ 1 | 28 | QZ 1 | | |
| 1 | TI 1 | 9 | TI 1 | 19 | TI 1 | 29 | TI 1 | 37 | TI 0.52 |
| 2 | QZ 2 | 10 | QZ 2 | 20 | QZ 2 | 30 | QZ 2 | 38 | QZ 2 |
| 3 | TI 2 | 11 | TI 2 | 21 | TI 2 | 31 | TI 2 | 39 | TI 2 |
| 4 | QZ 2 | 12 | QZ 2 | 22 | QZ 2 | 32 | QZ 2 | 40 | QZ 2 |
| 5 | TI 142 | 13 | TI 1 | 23 | TI 1 | 33 | TI 1 | 41 | TI 1.48 |
| 6 | QZ 0.58 | 14 | QZ 1 | 24 | QZ 1 | 34 | QZ 1 | | |
| | | 15 | TI 1 | 25 | TI 1 | 35 | TI 0.95 | | |
| | | 16 | QZ 1 | 26 | QZ 1 | 36 | QZ 1.38 | | |

TABLE 3

| | | | | | |
|---|---|---|---|---|---|
| 1 | TI 1.06 | 15 | TI 0.89 | 29 | TI 0.5 |
| 2 | QZ 1.19 | 16 | QZ 0.53 | 30 | QZ 1.28 |
| 3 | TI 1.55 | 17 | TI 1.55 | 31 | TI 1.87 |
| 4 | QZ 0.85 | 18 | QZ 1.22 | 32 | QZ 0.67 |
| 5 | TI 1 | 19 | TI 1 | 33 | TI 1 |
| 6 | QZ 1 | 20 | QZ 1 | 34 | QZ 1 |
| 7 | IJ 4 | 21 | TI 4 | 35 | TI 4 |
| 8 | QZ 1 | 22 | QZ 1 | 36 | QZ 1 |
| 9 | TI 1 | 23 | TI 1 | 37 | TI 1 |
| 10 | QZ 0.7 | 24 | QZ 0.94 | 38 | QZ 2.44 |
| 11 | TI 0.27 | 25 | TI 0.58 | 39 | TI 1.32 |
| 12 | QZ 1.68 | 26 | QZ 0.99 | | |
| 13 | TI 1.15 | 27 | TI 1.04 | | |
| 14 | QZ 1 | 28 | QZ 1 | | |

TABLE 4

| | | | | | | | | | |
|---|---|---|---|---|---|---|---|---|---|
| 1 | TA 1.85 | 17 | TA 1.49 | 33 | TA 1.03 | 49 | TA 1.39 |
| 2 | QD 0.53 | 18 | QD 1.24 | 34 | QD 0.76 | 50 | QD 1.11 |
| 3 | TA 1.13 | 19 | TA 0.72 | 35 | TA 0.77 | 51 | TA 1.1 |
| 4 | QD 0.81 | 2D | QD 0.66 | 36 | QD 1.14 | 52 | QD 0.75 |
| 5 | TA 1. | 21 | TA 1. | 37 | TA 1. | 53 | TA 1. |
| 6 | QD 1. | 22 | QD 1. | 38 | QD 1. | 54 | QD 1. |
| 7 | TA 1. | 23 | TA 3. | 39 | TA 3. | 55 | TA 1. |
| 8 | QD 2. | 24 | QD 4. | 40 | QD 4. | 56 | QD 2. |
| 9 | TA 1. | 25 | TA 1. | 41 | TA 1. | 57 | TA 1. |
| 10 | QD 1. | 26 | QD 1. | 42 | QD 1. | 58 | QD 1. |
| 11 | TA 1. | 27 | TA 1. | 43 | TA 1. | 59 | TA 1. |
| 12 | QD 1. | 28 | QD 1. | 44 | QD 1. | 60 | QD 1. |
| 13 | TA 1. | 29 | TA 1. | 45 | TA 1. | 61 | TA 1. |
| 14 | QD 1. | 30 | QD 0.96 | 46 | QD 0.64 | 62 | QD 0.50 |
| 15 | TA 1. | 31 | TA 1.58 | 47 | TA 1.34 | 63 | TA 1.72 |
| 16 | QD 1. | 32 | QD 1. | 48 | QD 1. | 64 | QD 1. |

What we claim is:

1. A bandpass filter having at least a primary passband region and a secondary passband region within transmission zones of the filter and outside the reflection zones of the filter, the filter comprising at least two outer cavities and at least one inner cavity disposed therebetween, each cavity having a spacer region of at least a high or low index material disposed between two reflector stacks, the thickness of the spacer regions in the cavities are of a thickness of a halfwave or a multiple-half-wave at the primary passband the reflector stacks of any of the cavities including quarter wave layers, said quater wave layers being a quarter wave in thickness at the primary passband, the reflector stacks of a plurality of cavities, including at least one inner cavity, including one or more non-quarter wave layers at the primary passband, said one or more non-quarter wave layers having a thickness excluding a quarter wave or an integer multiple of a quarter wave at the primary passband for enhancing transmission in the secondary passband.

2. A bandpass filter as defined in claim 1, wherein said non-quarter wave layers are greater than or less than a quarter wave thickness at the primary passband.

3. A bandpass filter as defined in claim 1, wherein the thickness of at least one spacer region is a multiple half-wave at the primary passband.

4. A bandpass filter as defined in claim 1, wherein the one or more non-quarter wave layers are provided in the reflector stacks of the plurality of cavities to effect at least 90% transmission in the primary and the secondary passband regions.

5. A bandpass filter as defined in claim 4, wherein a plurality of non-quarter wave layers are provided in a plurality of the reflector stacks to effect transmission in the primary and the secondary passband regions.

6. A bandpass filter as defined in claim 1, wherein the spacer layer of at least one of the cavities is comprised of three half wave or multiple half wave layers of alternating high index material and of low index material to reduce polarization dependence in the primary passband.

7. A bandpass filter as defined in claim 1, wherein the spacer layers of the plurality of cavities are each of a thickness of a multiple half-wave and comprise high and low refractive index material.

8. A bandpass filter for passing at least a primary wavelength passband and a secondary wavelength passband, the secondary wavelength passband being outside the reflection zone of the filter, comprising: a plurality of cavities adjacent one another including a first outer cavity, a second outer cavity and at least one inner cavity disposed therebetween, each cavity comprising a spacer region disposed between two reflectors, some spacer regions comprising a plurality of high and low refractive index layers, said layers being of a thickness of a half-wave or multiple half wave at the primary passband, the reflectors comprising one or more reflector layers of alternating high and low index material, at least one reflector of each of two or more cavities, including the at least one inner cavity, including at least some of the reflector layers being of a thickness excluding a quarter wave or an integer multiple of a quarter wave at the primary passband, other of the reflector layers in at least some of the cavities being quarter wave layers at the primary passband.

9. A bandpass filter as defined in claim 8, wherein at least one reflector of the two or more cavities include non-quarter wave layers, and wherein a core, including the spacer region and adjacent quarter wave layers, of the two or more cavities are unmodified to transmit the primary passband.

10. A method of designing a bandpass filter having at least a primary passband and a secondary passband region within transmission zones of the filter and outside reflection zones of the filter comprising the steps of:

selecting a bandpass filter having a desired primary passband and substantially no reflection in a desired secondary passband, said bandpass filter including at least two outer cavities and at least one inner cavity disposed therebetween each comprising a spacer of a thickness of a half-wave or a multiple-half-wave at the primary passband surrounded by reflector of multiple quarter wave layers being a quarter wave in thickness at the primary passband;

designating one or more quarter wave layers, outside a core area including the spacer and adjacent quarter wave layers, of a plurality of cavities, including at least one inner cavity of the at least two outer cavities and the at least one inner cavity, for modification;

resolving a thickness for each said designated layer to a thickness excluding a quarter wave or an integer multiple of a quarter wave at the primary passband to optimize transmission of the secondary passband.

11. A method of generating a band pass filter as defined in claim 10, wherein one or more of the designated layers is eliminated from the primary bandpass filter as a consequence of optimization.

* * * * *